United States Patent [19]

Lessner

[11] 4,120,586
[45] Oct. 17, 1978

[54] METHOD AND MEANS FOR ALIGNING FOCUSING MIRRORS IN AN OPTICAL SPECTROMETER

[75] Inventor: David L. Lessner, Baltimore, Md.

[73] Assignee: Baxter Travenol Laboratories, Inc., Deerfield, Ill.

[21] Appl. No.: 763,383

[22] Filed: Jan. 28, 1977

[51] Int. Cl.² .............................. G01J 3/18; G02B 7/18
[52] U.S. Cl. ..................................... 356/100; 248/466; 248/219.2; 248/225.4; 350/288
[58] Field of Search ................ 356/74, 79, 96, 97, 356/98, 99, 100, 101, 138, 256; 248/466, 475 R, 476, 219.2, 225.3, 225.4; 350/245, 293, 252, 288, 287, 307, 310, 321; 331/94.5 D

[56] References Cited

U.S. PATENT DOCUMENTS

| | | | |
|---|---|---|---|
| 2,623,436 | 12/1952 | Olson | 248/475 R |
| 3,009,747 | 11/1961 | Pitzer | 279/2 X |

FOREIGN PATENT DOCUMENTS 228,441 5/1960 Australia .................................. 350/307

OTHER PUBLICATIONS

Operation Manual for the Heath Scanning Monochromator, EU-700 and EUE-700 series, pp. 9-16 and 10-2, Nov. 7, 1969.

Primary Examiner—F. L. Evans
Attorney, Agent, or Firm—Henry W. Collins; Grace Fishel; George H. Gerstman

[57] ABSTRACT

A method and means facilitating alignment of a focusing mirror in an optical spectrometer to maximize resolution and performance capability. More particularly, in an optical spectrometer having a monochromator with entrance and exit ports and a grating, an improved method and means for aligning a focusing mirror so that an optical beam can be easily and accurately focused on the entrance or exit ports of the monochromator or on its grating.

12 Claims, 7 Drawing Figures

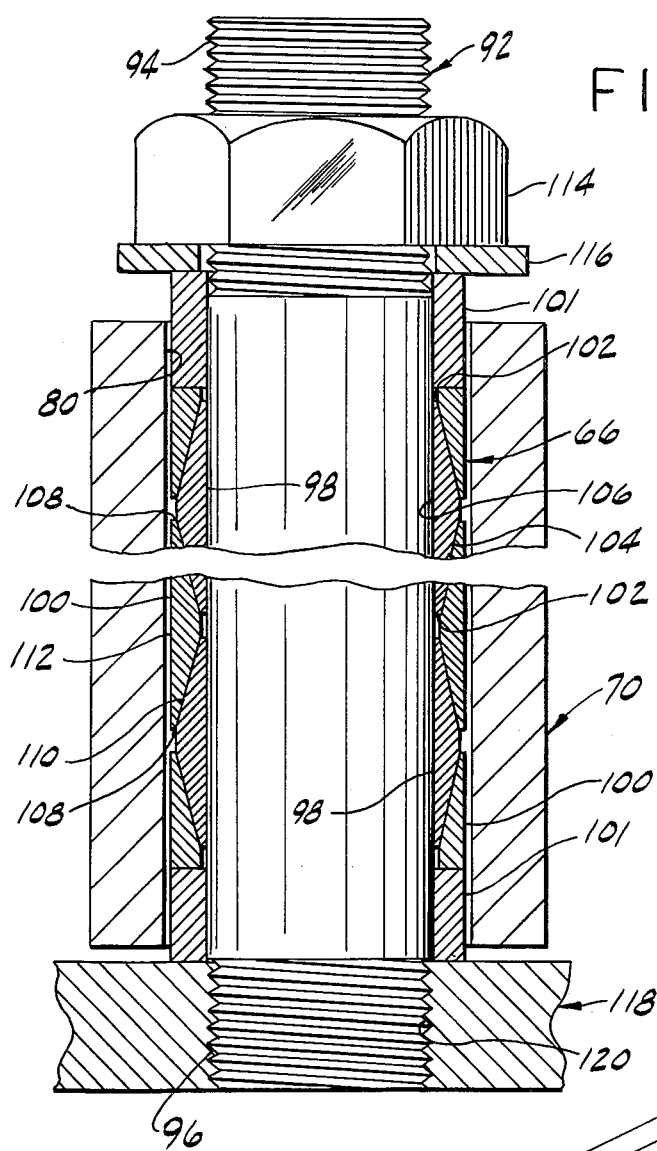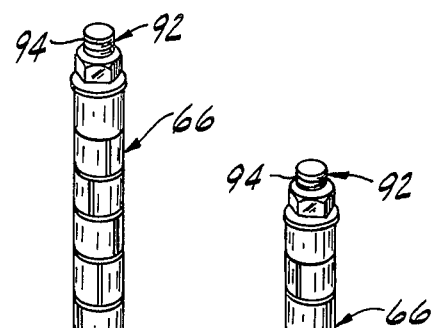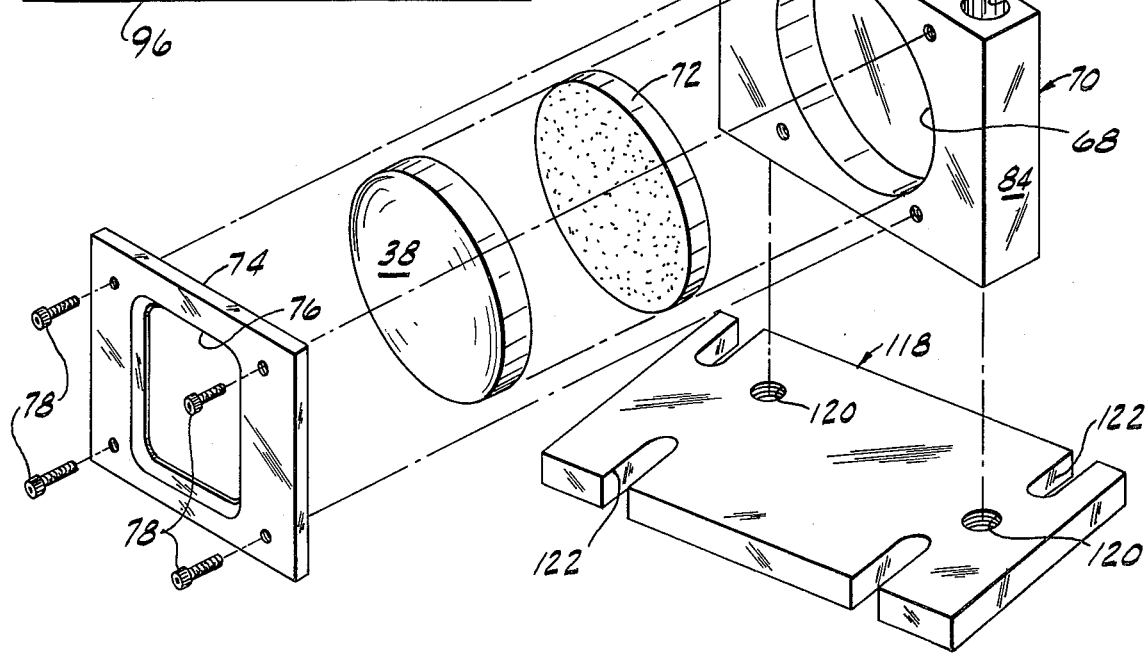

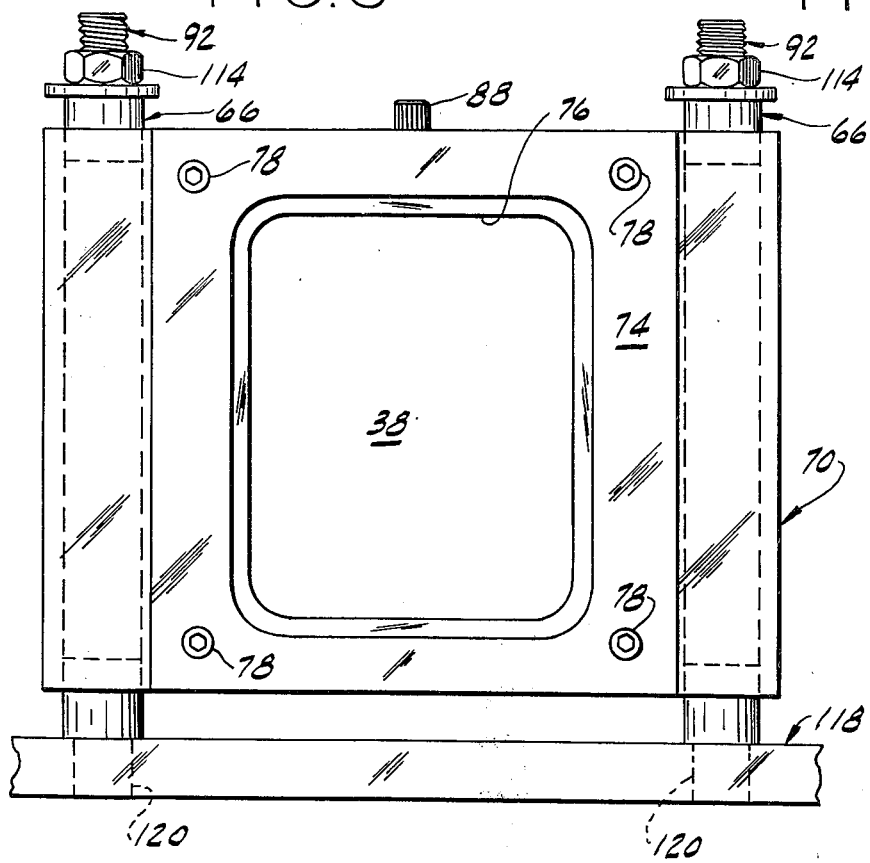
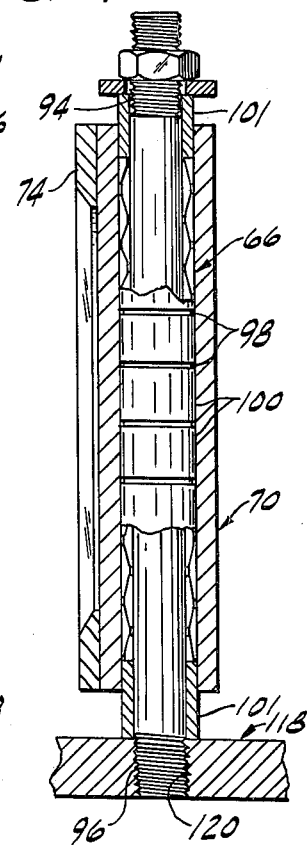
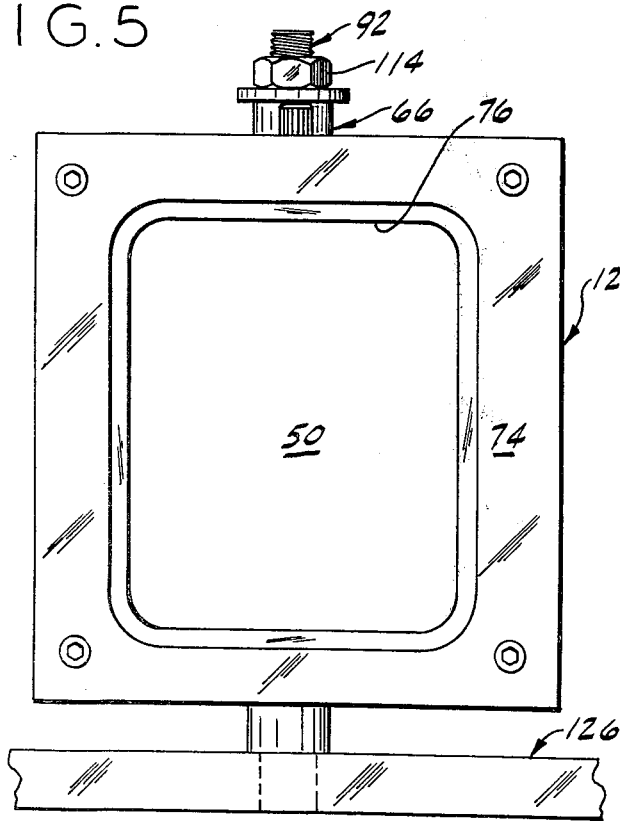
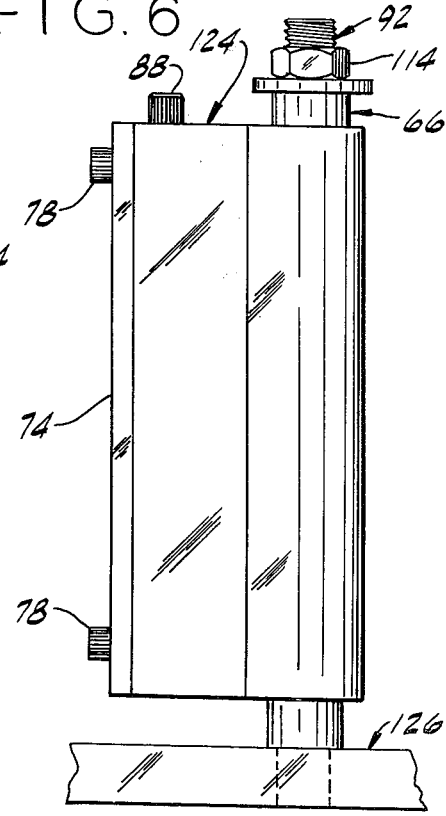

METHOD AND MEANS FOR ALIGNING FOCUSING MIRRORS IN AN OPTICAL SPECTROMETER

This invention relates to a method and means for aligning focusing mirrors in an optical spectrometer.

To achieve high resolution, it is necessary that the optics in a spectrometer be accurately aligned. When the optics include focusing mirrors, each mirror should be aligned so that its focal point is precisely located as required.

For example, when the spectrometer includes a monochromator having a pair of focusing mirrors and a grating, the first focusing mirror should be positioned such that the entrance port is accurately imaged on the grating while the second mirror images the grating on the exit port. When a focusing mirror is used to focus an optical beam on the entrance port of the monochromator, the alignment of the mirror is similarly critical to the achievement of high resolution.

When a spectrometer is built, its focusing mirrors are usually permanently aligned and tightened in place. Unless the instrument is abused, the mirrors are usually never aligned again.

There have been means for permanently mounting focusing mirrors in the past. With these devices, however, the mirror tends to shift in an unpredictable manner as the mount is tightened thus defeating precise alignment. Either the mount is again loosened and the mirror aligned again or the shift is anticipated after being once tightened and compensated for in advance when the mirror is aligned a second time. Since the shift for each mount is different and cannot be ascertained by reference to another similar mount, alignment of the focusing mirrors is a tedious and time consuming procedure.

In view of the above, there is a need for a method and means which simplifies the permanent alignment of focusing mirrors in an optical spectrometer. Therefore, among the several objects of the present invention is to provide an improved method and means to accomplish such alignment. Other objects and features will be in part apparent and in part pointed out hereinafter.

The invention accordingly comprises the method and means hereinafter described, the scope of the invention being indicated in the subjoined claims.

In the accompanying drawings, in which several of various possible embodiments of the invention are illustrated, corresponding reference characters refer to corresponding parts.

FIG. 2 is an exploded, perspective view of the means for mounting the focusing mirror which images the entrance port on the grating in either monochromator;

FIG. 3 is a front elevational view of the mounting means shown in FIG. 2;

FIG. 4 is a vertical cross-sectional view of the mirror mounting means showing a radially outwardly expanding bushing assembly for tightening the mounting means in position;

Fig. 5 is a front elevational view of the means for mounting the focusing mirror which images the sample on the entrance port of the emission monochromator;

FIG. 6 is a side elevational view of the mounting means shown in FIG. 5; and

FIG. 7 is a vertical cross-sectional view of the bushing assembly.

Figure 1:
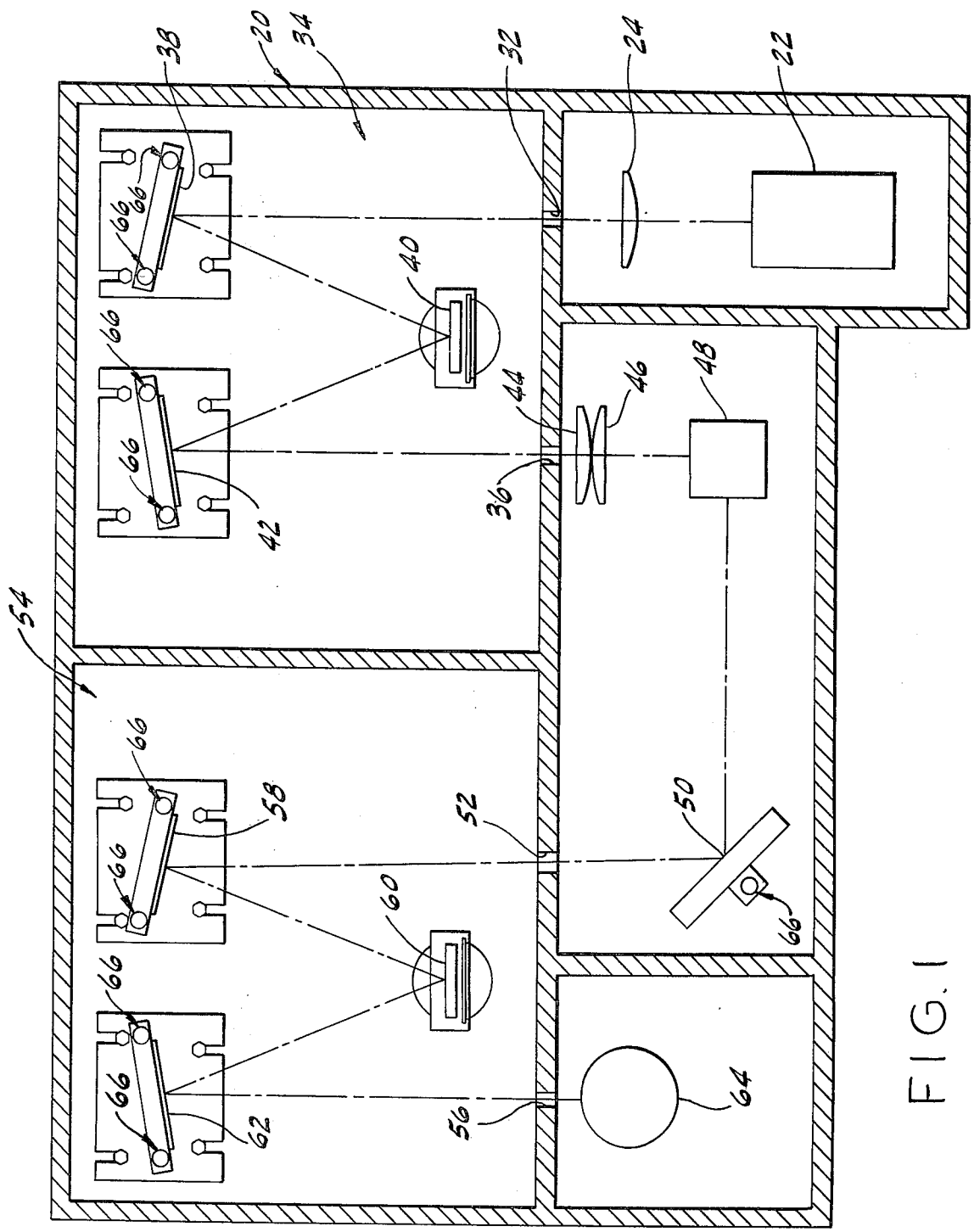
FIG. 1 is a horizontal cross-sectional view of a typical optical spectrometer having an excitation monochromator and an emission monochromator wherein the focusing mirrors are supported by mirror mounting means according to the present invention.

Referring to FIG. 1, there is shown an optical spectrometer 20 wherein an image of a radiant energy source, such as lamp 22, is focused by lens 24 on an entrance slit 32 of an excitation monochromator 34.

The excitation monochromator 34 disperses the radiation from lamp 22 and causes its spectrum to be focused on an exit slit 36. To this end, the radiation from entrance slit 32 is imaged by a first spherical mirror 38 on a grating 40. A second spherical mirror 42 then images the grating on exit slit 36. By rotating grating 40, the wavelength of the radiation imaged on the exit slit is selected.

Radiation passing through exit slit 36 is focused by a pair of lenses 44 and 46 on a sample 48. Some of the radiant energy passing through sample 48 is absorbed and converted into energy of a longer wavelength.

Since the particular instrument shown is a fluorometer, the energy emitted from the sample is at a right angle to the incident energy and is focused by toroidal mirror 50 on an entrance slit 52 of an emission monochromator 54. Emission monochromator 54 disperses the radiation from sample 48 and causes its spectrum to be focused on an exit slit 56. As in the excitation monochromator, the radiation from entrance slit 52 is imaged by a first spherical mirror 58 on a grating 60. A second spherical mirror 62 then images the grating on exit slit 56. Like grating 40, as grating 60 is rotated, the wavelength of the radiation imaged on the exit slit is selected. Radiation emerging from exit slit 56 is passed through a detector, such as a photomultiplier tube 64 whose electrical output is amplified and recorded.

Among other important factors, the ability of spectrometer 20 to resolve emissions from sample 48 is dependent on the precision with which the optics are aligned. It is to the alignment of the optics, more particularly the focusing mirrors, that the present invention relates, the spectrometer thus far described being otherwise conventional.

As shown in FIG. 1, monochromator spherical mirrors 38, 42, 58 and 62 and corner toroidal mirror 50 are fixedly mounted by means of radially expandable mounting means 66 with the mirrors accurately aligned.

Referring now to FIG. 2, right excitation monochromator mirror 38 is received in a recess 68 provided in one face of a mirror mounting block 70. As shown, recess 68 is deeper than mirror 38 is thick and is further provided with a resilient biasing means, shown as foam pad 72.

A mask 74 with an aperture 76 is attached to block 70 by screws 78. Aperture 76 registers with recess 68 so that mirror 38 is visible behind mask 74 while mask 74 provides an abutment surface against which peripheral portions of the mirror are biased by pad 72.

Two channels shown as bores 80 and 82 are provided through mirror mounting block 70 adjacent opposite side edges 84. As shown, bores 80 and 82 are substantially parallel to each other and to said side edges. Remaining side edges 86 are substantially normal to said bores.

As shown, recess 68 is positioned midway between bores 80 and 82 and has a diameter slightly larger than mirror 38 which is also circular. When mirror 38 is seated in recess 68, it is held in place by mask 74 and centered by a set screw 88 threaded through a tapped hole 90 provided in the upper one of sides 86. Tapped hole 90 is located midway between bores 80 and 82. Thus, when set screw 88 is tightened against mirror 38, the mirror is centered in said recess between said bores.

As seen in FIGS. 2–4 and 7, radially expandable mounting means 66 are received in bores 80, 82. Each of mounting means 66 includes a stud 92 having threads at opposite ends 94 and 96 and a plurality of axially aligned mating male and female circular members or bushing segments 98 and 100, respectively, as described in U.S. Pat. No. 3,009,747. As best seen in FIG. 7, bushing segments 98 and 100 are sandwiched between upper and lower cylindrical collars 101.

As shown, male members 98 have flat annular ends 102, an exterior conical surface 104 and an interior cylindrical surface 106. Mating female members 100 have flat annular ends 108, an interior conical surface 110 and an exterior cylindrical surface 112. Each of members 98 and 100 has at least one longitudinally extending slot, the exterior and interior surfaces thereof being otherwise uninterrupted.

When a longitudinal compressive force is exerted on axially aligned male and female bushing segments 98 and 100, they undergo angular, longitudinal and radial movement as described in the above-mentioned patent relative to each other and to stud 92. This is accomplished when a nut 114 is tightened on upper end 94 of stud 92 which presses a washer 116 against upper cylindrical collar 101 and thus against the endmost of male and female members 98 and 100. A corresponding force is applied through lower cylindrical collar 101 by a base plate 118 into which lower ends 96 of stud 92 are threaded.

For this purpose, base plate 118 has tapped holes 120 which are spaced apart a distance equal to the distance between bores 80 and 82. Base plate 118 is further provided with notches 122 for use as described below.

As best understood with reference to FIG. 7, as nut 114 is tightened against washer 116, male and female members 98 and 100 slide on each other as they are compressed vertically. Since the lower collar 101 and through it the endmost of female bushing segments 100 are restrained by base plate 118, they undergo no vertical movement. The other male and female segments, however, do move downwardly, the amount of movement being progressively greater from bottom to top.

In use, radially expandable mounting means 66 are threaded into holes 120 provided therefor in base plate 118. Base plate 118 with the radially expandable mounting means 66 is provisionally positioned in excitation monochromator 34 as shown in FIG. 1 using notches 122.

Mirror 38 is seated in recess 68 behind mask 74 with form pad 72 in place. Mirror 38 is then centered in recess 68 between bores 80 and 82 by tightening set screw 88.

With axially aligned male and female bushing segments 98 and 100 in place on studs 92, mirror mounting block 70 is slipped over the radially expandable mounting means using bores 80 and 82. Washers 116 and nuts 114 are then placed on studs 92.

Nuts 114 are tightened slightly so that mounting means 66 expand radially into bores 80 and 82 for provisionally supporting the mirror. To this end, sufficient tightening force is applied to nuts 114 so that mirror mounting block 70 is frictionally held in a selected position on mounting means 66, but for convenience in aligning the instrument, not so tightly that the block cannot be moved vertically without loosening the nuts.

Using the same procedure as with mirror 38, mirrors 42, 58 and 62 are provisionally positioned in optical spectrometer 20.

Corner mirror 50 is similarly mounted in mirror mounting block 124. As shown in FIGS. 5 and 6, this block differs from mirror mounting block 70 in that it is supported on a single radially expandable mounting means 66. Corresponding differences are seen in base plate 126.

Once the mirrors have been provisionally positioned, the instrument can be precisely aligned. To this end, the mirrors are adjusted horizontally through notches 122 and vertically on radially expandable mounting means 66 until the mirrors image the light as required. Once this condition has been achieved, the mirror mounting blocks are moved upwardly a predetermined distance so that the mirrors are above their true focus. Each mirror mounting assembly is tightened in place. When nuts 114 are tightened to secure the vertical placement of the mirrors, the mirror mounting blocks move a small, predetermined amount vertically downwardly. When this distance is equal to that which the mirror mounting blocks were elevated, the mirrors are brought back into true focus. Unlike prior art mirror mounts, the amount of this shift can be accurately predetermined as described below with reference to a similar mount. This is an improvement over prior art mounting means wherein the shift cannot be so predetermined.

To predetermine the amount of downward shift, a first, test mirror mounting block is floatingly supported on studs 92 by applying necessary torque to nuts 114 and its position determined with reference to some fixed point. Nuts 114 are then tightened to some certain torque for dead lock. As the nuts are tightened, the bushing assemblies, as above described, are compressed vertically as the male and female members slide on each other. Since the mirror mounting block is supported by the bushing assemblies, the mounting block also moves downwardly as said assemblies are compressed.

As will be understood with reference to FIG. 7, the amount of downward shift is determined, among other factors, by the number of segments. In general, the more segments, the greater will be the shift. That being so, it is preferred that the number of male and female bushing segments be minimized. For this purpose the minimum number is three. When less than the number shown in FIG. 7 are used, additional or wider collars 101 are added to fill in as needed.

When the amount of expected downward shift given to the mounting block has been empirically determined for the test bushing assembly, from then on the mirror mounting blocks are provisionally supported, as above mentioned, using the same torque on nuts 114 which was used when the shift was experimentally predetermined. The mirrors are then focused and the blocks shifted upwardly said predetermined distance which they will shift downwardly when the blocks are vertically tightened in place. Nuts 114 are then tightened with the torque necessary for dead lock causing the mounting blocks to settle the predetermined distance and bringing the mirrors back into true focus.

Alternatively, the amount of downward shift can be predetermined and compensated for as follows. Nuts 114 are tightened with a torque necessary for dead lock and then loosened a given number of turns until the mirror mounting block is floatingly supported on studs 92. The position of the mirror mounting block is then determined with reference to some fixed point. Nuts 114 are tightened the same number of turns that they were loosened and the amount that the mirror mounting block is shifted downward is determined.

Once this distance is predetermined, each mirror mounting block is tightened on studs 92 to dead lock and nuts 114 loosened the given number of turns. The mirrors are then vertically focused and raised the predetermined distance above true focus that they will settle when nuts 114 are tightened said number of turns. This latter procedure is sufficiently accurate for use in actual assembly of instruments and is preferred since only one torque reading on each of nuts 114 is required.

In view of the above, it will be seen that the several objects of the invention are achieved and other advantageous results attained. As various changes could be made in the above method and means for aligning focusing mirrors in an optical spectrometer without departing from the scope of the invention, it is intended that all matter contained in the above description or shown in the accompanying drawings shall be interpreted as illustrative and not in a limiting sense.

What is claimed is:

1. A means facilitating alignment of a focusing mirror which comprises a mirror mounting means for receiving a focusing mirror, radially expandable mounting means, said mirror mounting means having a bore for receipt of said radially expandable mounting means, a base plate, said radially expandable mounting means being attached to said base plate and providing rigid support in expanded condition for the mirror mounting means; and means for exerting a compressive force on said radially expandable mounting means.

2. The means facilitating alignment of a focusing mirror according to claim 1 wherein the mirror mounting means includes a mirror mounting block having a recess with a diameter greater than the diameter of the focusing mirror and a depth greater than the thickness of said mirror, a mask attached to the mirror mounting block, said mask having an aperture which registers with said recess, and a resilient biasing means in the recess which biases peripheral portions of said mirror against the mask.

3. The means facilitating alignment of a focusing mirror according to claim 2 wherein the mirror mounting block has a pair of parallel bores adjacent opposite side edges and the recess is located midway therebetween, said recess further provided with a tapped hole midway the bores for use with a screw in centering the focusing mirror between said bores.

4. The means facilitating alignment of a focusing mirror according to claim 3 wherein the base plate has notches.

5. The means facilitating alignment of a focusing mirror according to claim 1 wherein the radially expandable mounting means is a bushing assembly with a plurality of pairs of matching female and male circular spring rings positioned about a shaft for contact in expanded condition with said bore, said female rings of said pairs of rings having flat annular ends and an interior conical surface and an exterior cylindrical surface, said male rings of said pairs having flat annular ends and an exterior conical surface and an interior cylindrical surface, the conical surfaces of said rings being in wedging contact with each other, each of said rings being split by a slot extending entirely through the wall of said rings longitudinally of the axis of said rings, the exterior surface of said rings being otherwise uninterrupted, each of said rings of said pairs being constructed and arranged for angular, longitudinal and radial movement relative to each other on said shaft, and means for exerting a longitudinal compressive force on said rings to adjust the longitudinal and radial positions of said male and female rings by expanding the female rings and contracting the male rings.

6. The means facilitating alignment of a focusing mirror according to claim 5 wherein the shaft is attached to the base plate and the male and female circular spring rings are sandwiched between a pair of cylindrical collars.

7. The means facilitating alignment of a focusing mirror according to claim 6 wherein the shaft is threaded at its end opposite its attachment to the base plate and the means for exerting a longitudinal compressive force is a nut threaded on said shaft.

8. In a monochromator having a first focusing mirror for imaging an entrance port on a grating and a second focusing mirror for imaging the grating on an exit port, the improvement which comprises a means facilitating alignment of the focusing mirrors including a mirror mounting means for receiving each focusing mirror, radially expandable mounting means, said mirror mounting means having a bore for receipt of said radially expandable mounting means, a base plate, said radially expandable mounting means being attached to said base plate and providing rigid support in expanded condition for the mirror mounting means, and means for exerting a compressive force on said radially expandable mounting means.

9. The monochromator according to claim 8 wherein the radially expandable mounting means is a bushing assembly with a plurality of pairs of matching female and male circular spring rings positioned about a shaft for contact in expanded condition with said bore, said female rings of said pairs of rings having flat annular ends and an interior conical surface and an exterior cylindrical surface, said male rings of said pairs having flat annular ends, an exterior conical surface and an interior cylindrical surface, the conical surfaces of said rings being in wedging contact with each other, each of said rings being split by a slot extending entirely through the wall of said rings longitudinally of the axis of said rings, the exterior surface of said rings being otherwise uninterrupted, each of said rings of said pairs being constructed and arranged for angular, longitudinal and radial movement relative to each other on said shaft, and means for exerting a longitudinal compressive force on said rings to adjust the longitudinal and radial positions of said male and female rings by expanding the female rings and contracting the male rings.

10. A method for facilitating alignment of a focusing mirror which comprises the steps of: mounting a focusing mirror in a mirror mounting means having a bore, placing the bore over a radially expandable mounting means attached to a base plate, and thereafter expanding the radially expandable mounting means in said bore whereby the mirror mounting means is rigidly supported by the radially expandable mounting means.

11. The method for facilitating alignment of a focusing mirror according to claim 10 wherein the radially expandable means is expanded by exerting a longitudinal compressive force on said means.

12. The method for facilitating alignment of a focusing mirror according to claim 11 wherein the radially expandable mounting means are carried by a base and wherein said means move the mirror mounting means a reproducible distance towards said base as the means are radially expanded.

* * * * *